(12) United States Patent
Wittmann

(10) Patent No.: US 7,633,920 B2
(45) Date of Patent: Dec. 15, 2009

(54) COMMUNICATION TERMINAL WITH WLAN BASE STATION FUNCTIONALITY OR WLAN CLIENT FUNCTIONALITY

(75) Inventor: Christian Wittmann, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 385 days.

(21) Appl. No.: 11/579,930

(22) PCT Filed: Mar. 2, 2005

(86) PCT No.: PCT/EP2005/050928

§ 371 (c)(1),
(2), (4) Date: Nov. 9, 2006

(87) PCT Pub. No.: WO2005/112352

PCT Pub. Date: Nov. 24, 2005

(65) Prior Publication Data

US 2007/0160023 A1 Jul. 12, 2007

(30) Foreign Application Priority Data

May 13, 2004 (DE) .................. 10 2004 023 803

(51) Int. Cl.
*H04W 88/10* (2006.01)
(52) U.S. Cl. ...................... 370/338; 455/41.2
(58) Field of Classification Search .................. None
See application file for complete search history.

(56) References Cited

U.S. PATENT DOCUMENTS

| 6,659,947 B1 | 12/2003 | Carter et al. | |
| 2002/0159419 A1 | 10/2002 | Morris | |
| 2002/0174254 A1 | 11/2002 | Kita et al. | |
| 2003/0026270 A1 | 2/2003 | Ekkel | |
| 2003/0134596 A1 | 7/2003 | Zhu | |
| 2004/0166812 A1* | 8/2004 | Lumelsky | 455/67.11 |
| 2005/0037807 A1* | 2/2005 | Dove | 455/556.1 |
| 2005/0197061 A1* | 9/2005 | Hundal | 455/41.2 |
| 2005/0286466 A1* | 12/2005 | Tagg et al. | 370/329 |
| 2008/0003947 A1* | 1/2008 | Morris | 455/41.2 |

FOREIGN PATENT DOCUMENTS

| CN | 1455603 A | 11/2003 |
| EP | 0 998 094 A2 | 5/2000 |
| EP | 1 398 917 A1 | 3/2004 |
| WO | WO 02/08857 A2 | 1/2002 |

OTHER PUBLICATIONS

Benjamin Benz, "Stumm wie ein Stein", Lautlose Linux-Firewall, Praxis, 2004, pp. 204-206, No. 7, c't Heise Verlag.

* cited by examiner

*Primary Examiner*—Min Jung

(57) ABSTRACT

In one aspect a communication terminal comprising a first interface, a second interface is provided, and a connection unit. The first interface for connecting to a first network for the bidirectional transmission of information between the first interface and a central communication device, arranged in a first network. The second interface allows a link can be establishment with a radio network. The communication terminal is established as a base station for the radio network, when the connection unit is activated. The radio network is a WLAN.

18 Claims, 1 Drawing Sheet

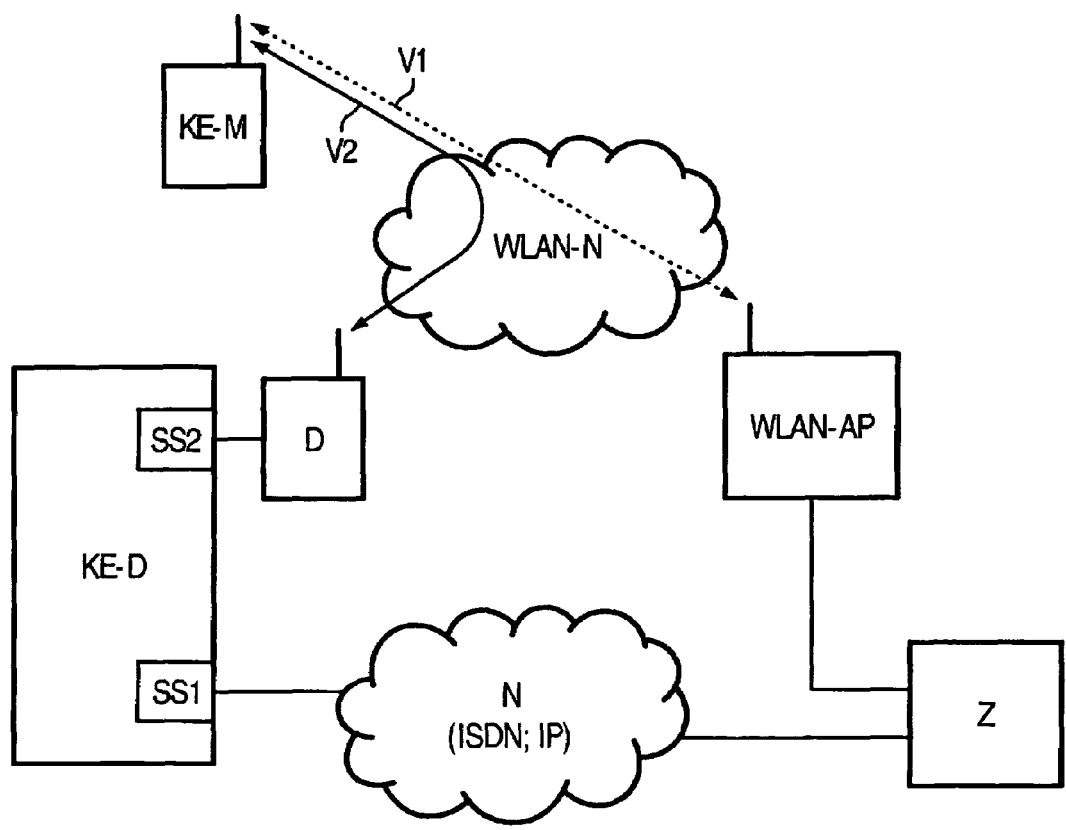

COMMUNICATION TERMINAL WITH WLAN BASE STATION FUNCTIONALITY OR WLAN CLIENT FUNCTIONALITY

CROSS REFERENCE TO RELATED APPLICATIONS

This application is the US National Stage of International Application No. PCT/EP2005/050928, filed Mar. 2, 2005 and claims the benefit thereof. The International Application claims the benefits of German application No. 102004023803.0 DE filed May 13, 2004, both of the applications are incorporated by reference herein in their entirety.

FIELD OF INVENTION

The present invention relates to a communication terminal with WLAN base station functionality or WLAN client functionality.

BACKGROUND OF INVENTION

Generally a distinction is made in telecommunications between wired and wireless communication. In such cases wired communication terminals are either connected directly via a cable or remotely via a network to a central communication device, for example a communication system (frequently also referred to as a communication server or a switching system). With wireless communication on the other hand, data is transmitted between a wireless communication terminal and the central communication device via a base station which is connected via an air interface to the wireless communication terminal. The base station is as a rule linked to the central communication device via a separate fixed broadband link. Data is transferred between the wireless communication terminal and the base station over the air interface on the basis of known standards, such as DECT (digital Enhanced Wireless Telecommunications), GSM (Global system for Mobile Communications), UMTS (Universal Mobile Telecommunications system) or WLAN (Wireless Local Area Network) for example.

A defined geographical area around a base station in which a wireless connection of predetermined quality is able to be established between a wireless communication terminal and a base station is frequently referred to in literature as the radio cell of this base station. To supply a larger geographical area with connection facilities a number of base stations are distributed over the geographical area for which coverage is to be provided so that their radio cells form a full-coverage radio network. A communication terminal registered in such a radio network can in this case switch between the base stations of this radio network located within its range in each case. The process by which a wireless communication terminal moves from coverage by a first base station to coverage by a second base station when a connection is in place is frequently referred to in the literature as a "handover".

The disadvantage of the arrangement described is the high cost associated with creating this type of radio network consisting of a plurality of base stations.

Network conference terminals are described in US 2002/174254 which are implemented by notebooks and in which a network interface card is provided in each case. The network interface card is embodied for connection to a wireless LAN, with the network conference terminals being able to be configured with the aid of the network interface cards in a wireless LAN into a conference. In this case one of the network conference terminals is the host, which takes over the central control of the setting up of the Wireless LAN and subsequently controls the conference.

Sectored Bluetooth Access Points are known from US 2003/134596, which on the one hand communicate with an Ethernet and on the other hand with up to 7 "Bluetooth devices". a Sectored Bluetooth Access Point is divided into four sectors, with a Bluetooth radio module being provided in each sector. Bluetooth terminals in the sector concerned communicate with the Ethernet, using the Bluetooth radio module and the Sectored Bluetooth Access Point

SUMMARY OF INVENTION

An object of the present invention is thus to provide measures by which a simple connection of wireless terminals to a central communication device is made possible.

According to the invention the object is achieved, using the features of the independent claim.

A major advantage of invention lies in the fact that a conventional "desktop terminal" can be converted in a simple manner using commercially-available plug-in components into a base station for the radio network—for example a WLAN network—and in this way a connection can be set up between the wireless terminal and the central communication device via the desktop terminal. This means that setting up additional base stations for enlarging the radio network to reach areas not previously covered by radio cells is not necessary.

Advantageous developments of the invention are specified in the dependent claims.

An advantage of embodiments specified in the dependent claims of the invention lies in the fact that, by using a WLAN network (Wireless LAN) as a second network, a higher data transmission rate can be implemented in the second network so that multimedia data can also be conveniently transmitted.

A further advantage of the embodiments specified in the dependent claims of the invention lies in the fact that the communication terminal can additionally be used as a mobile communication terminal so that the restrictions which exist with conventional wireless telephones in the area of user friendliness, battery life or handsfree use can be overcome.

BRIEF DESCRIPTION OF THE DRAWING

An exemplary embodiment of the invention is explained in more detail below on the basis of the sole drawing.

The Figure shows:

FIG. 1: a structure diagram for schematic presentation of the inventive communication terminal in a corresponding network infrastructure.

DETAILED DESCRIPTION OF INVENTION

FIG. 1 shows a schematic diagram of the inventive communication terminal KE-D, which is connected via a first interface SS1 to a first network N—for example an ISDN communication network or a IP (Internet Protocol)-oriented network—and via a second interface SS2 to a WLAN network WLAN-N. The communication terminal KE-D is a wired "desktop terminal". To give a better overview of the functional units necessary for the invention no further units of the communication terminal KE-D are shown in the Figure.

In the present exemplary embodiment the second interface SS2 is embodied as a USB (Universal Serial Bus) interface. What is known as a USB WLAN dongle D can be connected via the second interface SS2 to the communication terminal KE-D, via which a connection is set up to the WLAN network WLAN-N. Alternatively the second interface SS2 can be embodied as a PCMCIA (Personal Computer Memory Card International Association) interface and the USB WLAN dongle D as a plug-in PCMCIA WLAN card. These types of USB WLAN dongle or PCMCIA WLAN cards are already available.

A central communication device Z—frequently referred to in the literature as a central communication server or communication system—is arranged in the first network N, via which the communication terminal KE is controlled. Control in the present exemplary embodiment is taken to include the implementation of communication device-individual service features at the communication terminal KE. Furthermore the central communication device Z is connected via a WLAN base station WLAN-AP—frequently referred to in the literature as a WLAN Access Point—to the WLAN network WLAN-N.

In addition a wireless communication terminal KE-M is arranged in the WLAN network WLAN-N, from which a connection is to be established to the central communication device Z. The wireless communication terminal KE-M is for example a wireless telephone or a data processing device embodied with a connection to the WLAN network WLAN-N, e.g. a laptop. In accordance with the prior art, starting from the wireless communication terminal KE-M. a first connection V1 is set up to the WLAN access point WLAN-AP and from this to the central communication device Z. In cases in which the wireless communication terminal KE-M is located outside the radio cell of the WLAN access point WLAN-AP, a connection cannot normally be set up with the central communication device Z. This is indicated in the Figure by the dashed line showing the first connection V1 between the wireless communication terminal KE-M and the WLAN access point WLAN-AP.

In accordance with the invention there is therefore provision for the communication terminal KE-D to automatically be set up as a WLAN access point in the WLAN network WLAN-N when the USB WLAN dongle D is plugged in. This gives the option of setting up a second connection V2 between the wireless communication terminal KE-M and the communication terminal KE-D as an alternative to the first connection V1, with the communication terminal KE-D assuming the function of a WLAN access point. A bidirectional data transmission between the wireless communication terminal KE-M and the central communication device Z thus takes place via the USB WLAN dongle D, the communication terminal KE-D and the first communication network N.

Since as a rule a high availability is provided for desktop terminals, the embodiment of the desktop terminal as an inventive communication terminal KE allows a high network coverage to be achieved in a simple manner. For example, in a meeting room in which no network coverage is available, a desktop terminal present in the meeting room can be used as a WLAN access point.

In this case it should be ensured that the transmission bandwidth available between the wireless communication terminal KE-M and the central communication device Z is limited by the connection of the communication terminal KE to the first network N. If for example an ISDN-oriented communication network is involved to which the communication terminal KE-D is connected via an interface, a maximum of 64 kbit/s is available for a data transmission if one user data channel is used and a maximum of 128 kbit/s if both user data channels are used. Since voice data is exchanged as a rule, this data transmission rate is however sufficient in most cases. In an embodiment of the first network (N) as an IP-oriented network on the other hand, a higher data transmission rate is available, so that multimedia data can also conveniently be exchanged.

In accordance with a further embodiment of the invention the inventive communication terminal KE-D can be connected directly—i.e. without intermediate connection of the network N—to the central communication device Z.

As an alternative to the embodiment of the inventive communication terminal KE-D as WLAN access point the communication terminal KE-D can also be operated as a mobile communication terminal. In this case data is transferred bidirectionally between the communication terminal KE-D and the central communication device Z not via the first network N, but via the USB WLAN dongle D, the WLAN network WLAN-N and the WLAN access point WLAN-AP. The fact that the communication terminal KE-D can additionally be used as a mobile communication terminal means that the restrictions in the area of user friendliness, battery life and handsfree operation which exist with conventional wireless communication terminals can be overcome.

Power is supplied to the inventive communication terminal KE-D—as is normal with desktop terminals—by means of a separate power supply not shown in the diagram. Alternatively there is the option of implementing the power supply via the first interface SS1 and the first network N.

The invention claimed is:

1. A communication terminal configured for connecting to a central communication device arranged in a first network, comprising:
 a first interface effective for connecting to the first network and providing a bidirectional transfer of information between the first interface and the central communication device; and
 a second interface effective for connecting to a dongle of a wireless communication network,
 wherein the communication terminal is configured to be automatically set up as a base station of the wireless communication network when the dongle is connected to the second interface; and
 wherein a connection is establishable between at least one device of the wireless communication network and the central communication device via the communication terminal when the dongle is connected to the second interface.

2. The communication terminal as claimed in claim 1, wherein the first network is a fixed network.

3. The communication terminal as claimed in claim 2, wherein the fixed network is an IP-oriented network or an ISDN network.

4. The communication terminal as claimed in claim 2, wherein the second interface is a USB interface.

5. The communication terminal as claimed in claim 4, wherein the dongle is a USB WLAN dongle.

6. The communication terminal as claimed in claim 2, wherein the second interface is a PCMCIA interface.

7. The communication terminal as claimed in claim 6, wherein the dongle is a PCMCIA WLAN plug-in card.

8. The communication terminal as claimed in claim 2, wherein power is supplied via the first interface and the first network.

9. The communication terminal as claimed in claim 2, further comprising a power supply connected to the communication terminal.

10. The communication terminal as claimed in claim 2, wherein the communication terminal is a communication telephone configured to be directly connected to the central communication device.

11. The communication terminal as claimed in claim 2, wherein the communication terminal is embodied as a mobile communication terminal configured to establish a connection to the central communication device via the wireless communication network when the dongle is activate or is embodied as a desktop terminal configured to establish a connection to the central communication device via the wireless communication network when the dongle is activated.

12. The communication terminal of claim 1 wherein the wireless communication network is a radio network or a WLAN network.

13. The communication terminal of claim 1 wherein the connection establishable between the wireless communication network and the central communication device via the communication terminal is a connection between a wireless communication terminal of the wireless communication network and the central communication device.

14. A method for establishing a connection between a central communication device and a wireless communication device via a communication terminal, the central communication device arranged in a first network, the wireless communication device configured to communicate via a wireless communication network, the method comprising:

provviding a first interface of the communication terminal effective for connecting to the first network to permit a bidirectional transfer of information between the first interface and the central communication device;

providing a second interface of the communication terminal effective for communicating wirelessly to the wireless communication device;

activating the second interface so that the communication terminal is automatically set up as a base station of the wireless communication network; and establishing a connection between the wireless communication device and the central communication device via the first and second interfaces when the second interface is active.

15. The method of claim 14 wherein the wireless communication network is a radio network or a WLAN network.

16. The method of claim 14 wherein the second interface is activated by attaching a dongle to the second interface of the communication terminal.

17. The method of claim 14 wherein the first network is an IP-oriented network, an ISDN network, or a fixed network.

18. The method of claim 14 wherein the second interface is activated after a dongle is attached to the second interface and wherein the connection between the wireless communication device and the central communication device is established after the wireless communication device is out of connection range to a wireless communication cell of a WLAN access point.

* * * * *